United States Patent [19]

Forsythe et al.

[11] Patent Number: 5,313,126
[45] Date of Patent: May 17, 1994

[54] ELECTROMAGNETIC INTERFERENCE SUPPRESSING DC INTERCONNECT

[75] Inventors: Jeffry A. Forsythe; Jeffrey A. Kipp, both of Vancouver; Robert R. Osborn, Brush Prairie; Todd L. Russell, Camas, all of Wash.

[73] Assignee: Hewlett-Packard Company, Palo Alto, Calif.

[21] Appl. No.: 954,954

[22] Filed: Sep. 30, 1992

[51] Int. Cl.⁵ .................................... H02K 11/00
[52] U.S. Cl. ........................... 310/51; 310/68 R; 310/71; 310/DIG. 6; 361/111
[58] Field of Search ............... 310/51, 68 R, 71, 72, 310/226, DIG. 6; 361/111

[56] References Cited

U.S. PATENT DOCUMENTS

| | | | |
|---|---|---|---|
| 2,048,096 | 7/1936 | Bisley | 172/36 |
| 3,090,877 | 5/1963 | Baumhart | 310/154 |
| 3,594,598 | 7/1971 | Schaub | 310/220 |
| 4,323,804 | 4/1982 | Zelt | 310/72 |
| 4,329,605 | 5/1982 | Angi et al. | 310/68 R |
| 4,384,223 | 5/1983 | Zelt | 310/68 R |

*Primary Examiner*—Steven L. Stephan
*Assistant Examiner*—D. R. Haszko

[57] ABSTRACT

An electromagnetic interference suppressing (EMI) interconnect for connecting a DC motor to a DC source comprising a pair of copper sheets disposed between insulative sheets, and wrapped around the motor housing. A lead extends from each copper sheet for being connected to one side of the DC source. A connector tab extends from each copper sheet for being connected to one terminal of the DC motor. The copper sheets may be spaced laterally apart and disposed between a single pair of insulative sheets, or may be overlayed and separated by an insulative sheet. EMI suppression provided is greater than that possible with known capacitance devices of similar capacitance values.

12 Claims, 6 Drawing Sheets

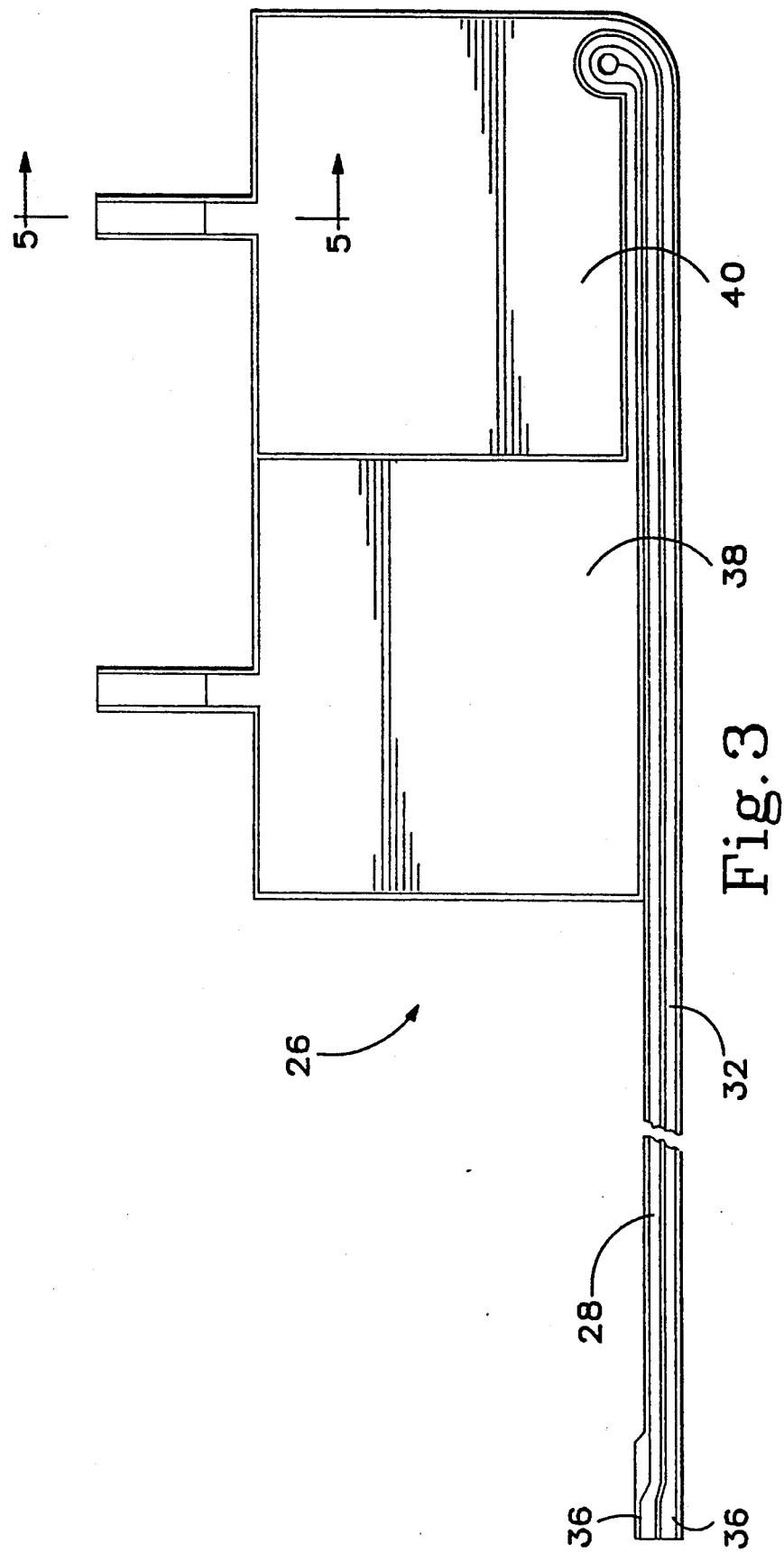

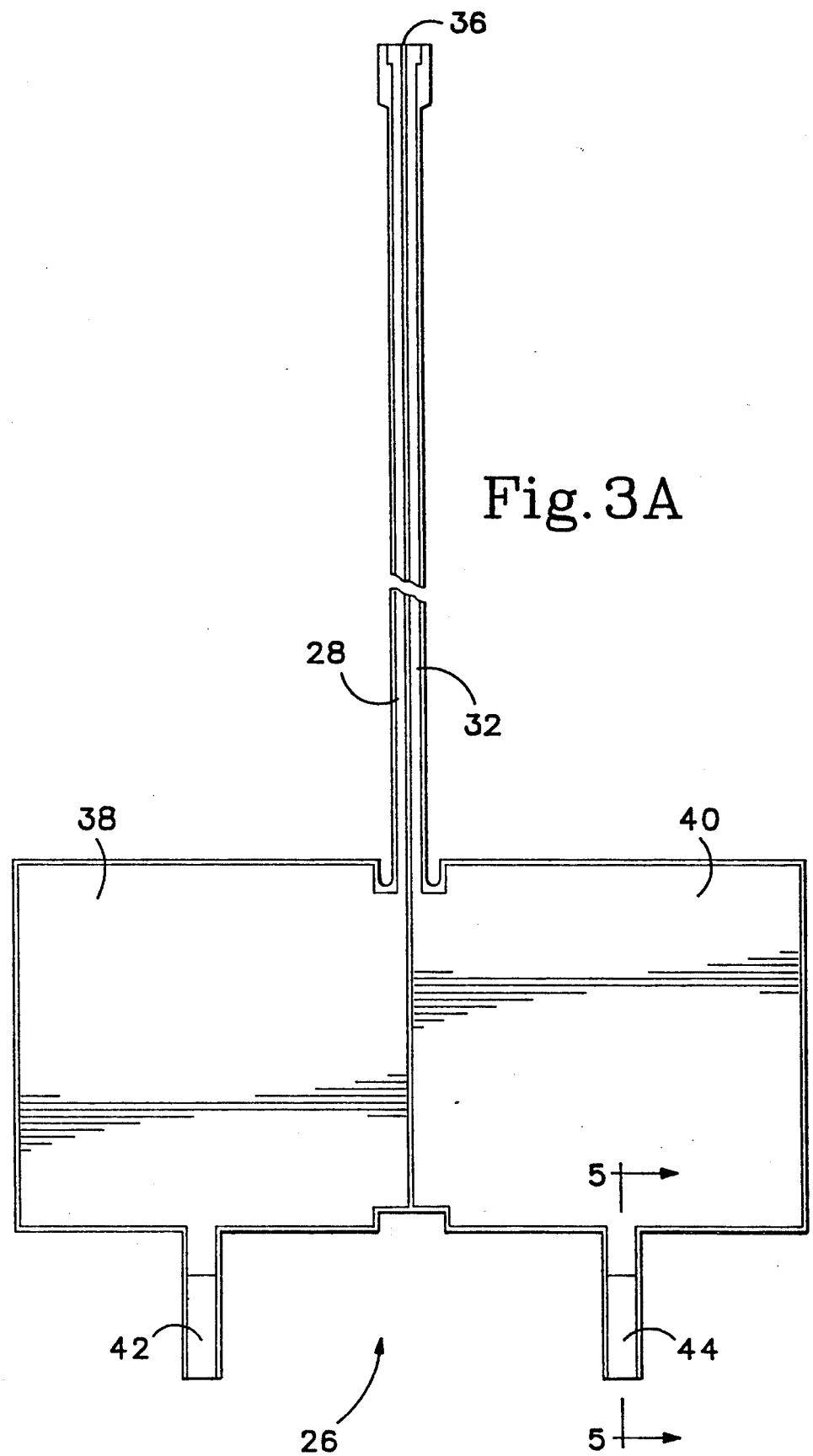

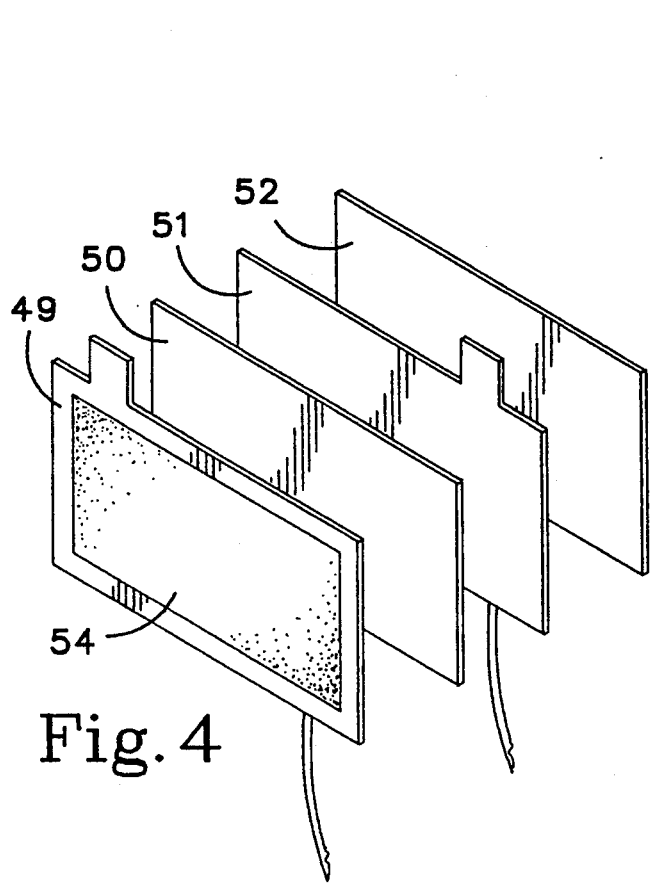
Fig. 4
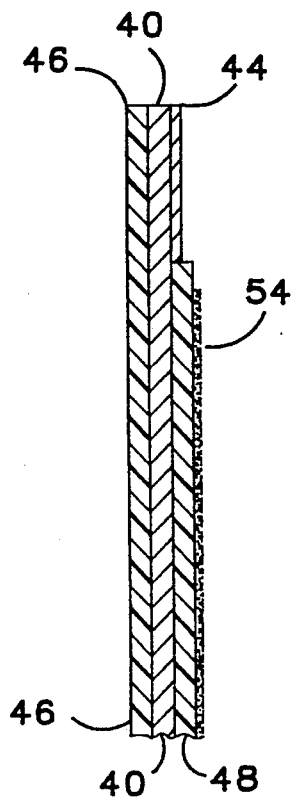
Fig. 5
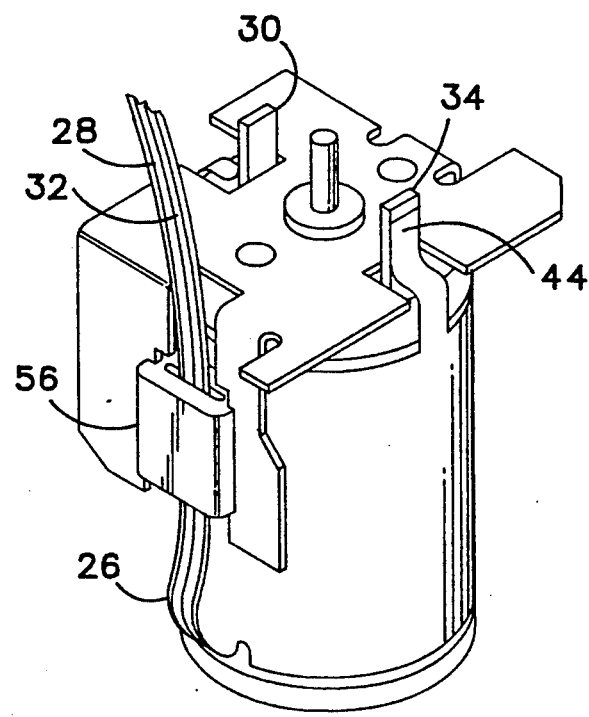
Fig. 6
Fig. 7

ELECTROMAGNETIC INTERFERENCE SUPPRESSING DC INTERCONNECT

BACKGROUND OF THE INVENTION

1. Field of the Invention

This invention relates generally to electromagnetic interference (EMI) suppression, and more particularly to an EMI suppressing interconnect to reduce the EMI produced by the commutating action within a direct current (DC) motor.

2. Description of Related Art

Direct current (DC) motors are well-known, and are commonly used in a broad variety of applications. One common application for DC motors is in printers associated with computers and word processors where the printer head is moved transversely along its path across the paper by a DC motor.

The computer industry is known to be very competitive, and is particularly so in the area of computer peripherals such as printers. Accordingly, there is an ongoing effort to reduce the cost of manufacturing printers while maintaining their reliability and compliance with applicable regulations such as those of the FCC and others regarding permissible amounts of electromagnetic interference (EMI) generated by printers. One opportunity to reduce the cost of a printer lies in the use of a less expensive DC motor to drive the printer head. However, lower-cost DC motors generate increased levels of EMI which often exceed those allowed by applicable regulations. The EMI referred to is that generated in the current supply leads by the commutating action of the DC motor as electrical contact between the brushes and successive segments of the rotor is repeatedly made and broken. FIG. 2 demonstrates the problem by showing the maximum, minimum and average EMI levels of a sample of fifty printer head drive motors. The maximum EMI value of the sample exceeds the maximum levels of EMI allowed by regulatory agencies at frequencies between 100 and 200 MHz. Therefore if lower cost DC motors are to be used to drive printer heads, their higher levels of EMI must be reduced.

Various methods are known for reducing EMI associated with DC motors. For example, a resistor ring having a resistance of 200–500 ohms may be fitted to the commutator. In the case of the restrictive packaging requirements of printers, this additional resistance results in the generation of additional heat which must be removed from the printer. Also it is difficult to control the resistance, and results in significant changes in the DC motor performance. Alternatively, a capacitor may be connected across the leads supplying current to the motor, but will not normally result in sufficient attenuation of EMI to meet the desired levels, or a ferrite ring may be fitted the leads to the motor. Both these solutions are also costly.

A varistor may be incorporated into the construction of the motor to reduce EMI, and typically will reduce EMI to acceptable levels. In some cases, however, packaging requirements or additional tooling costs involved in the manufacture of the motor render this solution unacceptable. Varistors are also not retrofittable to a motor.

Accordingly, a need remains for a low-cost DC motor which generates a reduced level of EMI, which is economical to manufacture and which, if need be, can be retrofitted to an existing DC motor.

SUMMARY OF THE INVENTION

It is an object of the invention to provide an EMI suppressing interconnect for connecting a DC motor to a DC source. The present invention provides an EMI suppressing DC interconnect for reducing the EMI levels generated by low-cost DC motors in the form of a novel capacitive device for connecting the DC motor to a DC source. An EMI suppressing DC interconnect according to the present invention comprises first and second conductive sheets, each having a conductive lead for being connected to a terminal of a DC source, and each conductive sheet also having a protruding connector tab for being electrically connected to a terminal of the motor. The first and second conductive sheets are preferably of copper, and are disposed adjacent one another between a single pair of insulative sheets, preferably a MYLAR ® film. Alternatively, the first and second conductive sheets may be disposed in substantial alignment on opposite sides of a common first insulative layer, with a second insulative layer overlaying one of the conductive sheets. An adhesive is preferably applied to one surface of the EMI suppressing DC interconnect for adhering it to the outer surface of the motor housing. The EMI suppressing DC interconnect is sized to envelop the outer cylindrical surface of the motor. When so fitted, EMI levels are substantially reduced.

The invention may also be embodied in a DC motor comprising a housing including magnets for generating a first magnetic field, first and second electrically conductive brushes mounted in said housing, a rotor mounted within the housing and having a plurality of conductive segments, each said segment for generating a second magnetic field responsive to a direct current passed therethrough for driving the rotor. Each said conductive segment has first and second contacts for periodically contacting the brushes for passing a direct current through each segment as the rotor is rotated. The DC motor includes an EMI suppressing interconnect as described above for connecting the DC motor to a DC source which suppresses EMI generated by the commutating action of the motor. The DC motor may also be fitted with additional EMI suppression means in the form of a ferrite ring surrounding the conductive leads of the EMI suppressing interconnect.

The foregoing and other objects, features and advantages of the invention will become more readily apparent from the following detailed description of a preferred embodiment of the invention which proceeds with reference to the accompanying drawings.

BRIEF DESCRIPTION OF THE DRAWINGS

FIG. 3 is a plan view of an EMI suppressing interconnect according to the present invention.

FIG. 3A is a plan view of an EMI suppressing interconnect according to an alternative embodiment of the present invention.

FIG. 4 is an exploded perspective view of an EMI suppressing interconnect according to a second alternative embodiment of the present invention.

FIG. 5 is a cross-sectional view along A—A of the EMI suppressing interconnect shown in FIG. 3.

FIG. 6 is a perspective of a ferrite ring according to the present invention.

FIG. 7 is a perspective view of a DC motor fitted with an EMI suppressing interconnect and ferrite ring according to the present invention.

DETAILED DESCRIPTION OF THE PREFERRED EMBODIMENT

Figure 1:
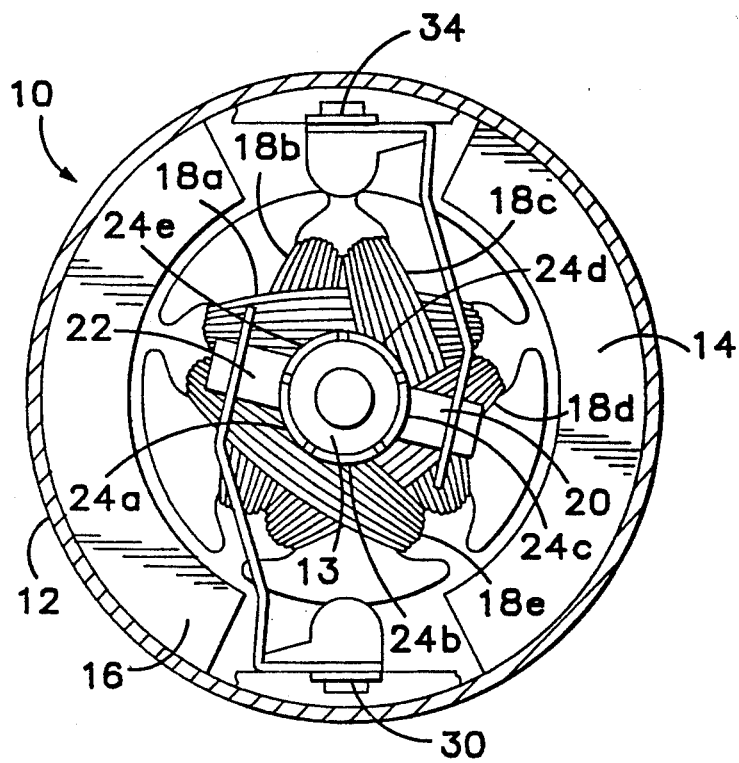
FIG. 1 is a cross-sectional schematic view of a DC motor.
Figure 1A:
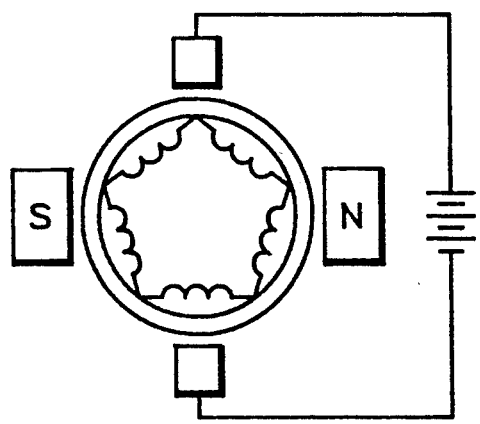
FIG. 1A is an electrical schematic diagram of the DC motor shown in FIG. 1.
Figure 2:
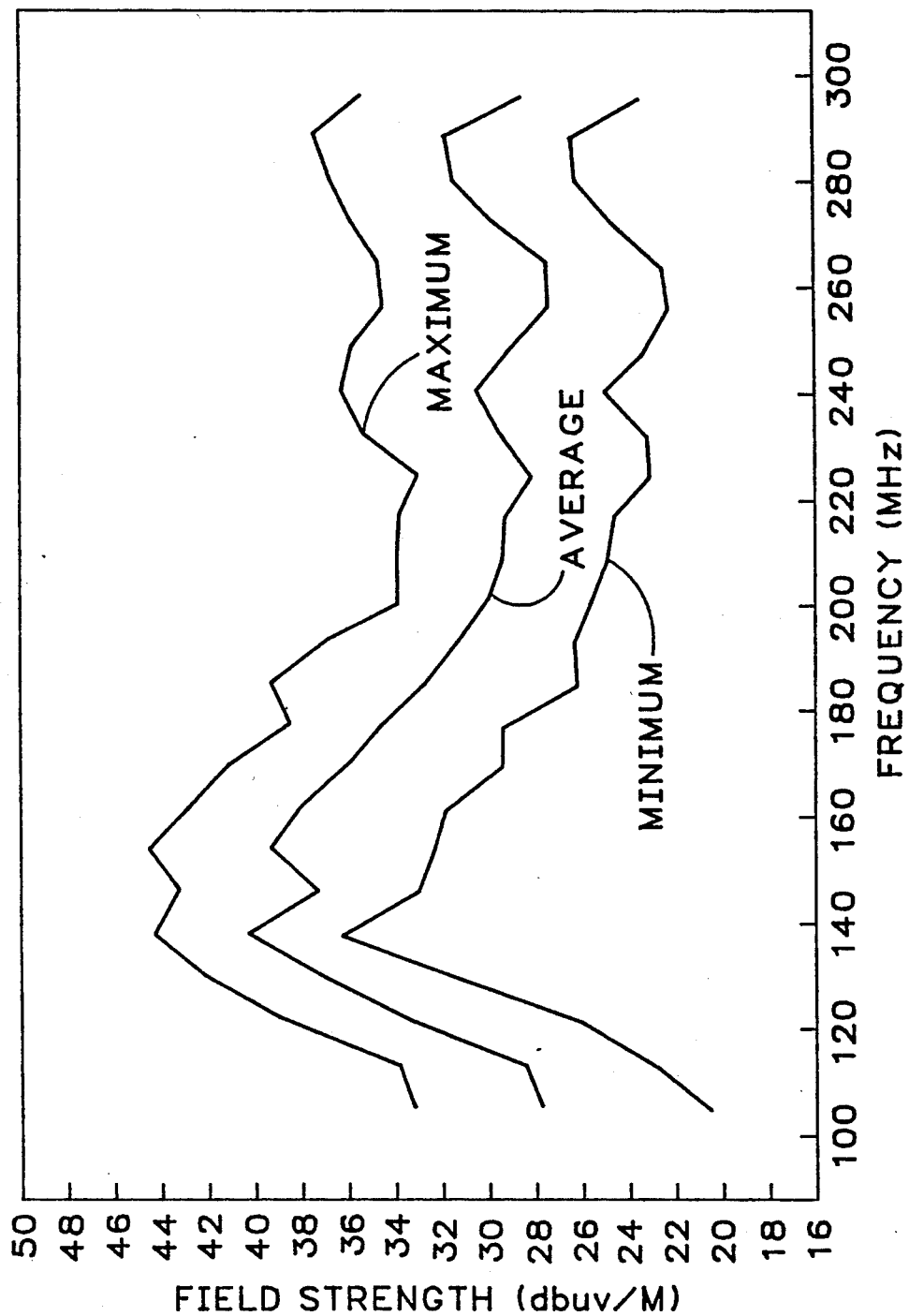
FIG. 2 is a graph showing the EMI generated by a sample of fifty DC printer head drive motors.

Referring to FIG. 1, a typical five-segment, 19 volt DC motor for use in driving a printer head is shown generally at 10. Motor 10 includes a housing 12, and a rotor 13. Permanent magnets 14 and 16 are mounted in housing 12. Rotor 13 includes five discrete windings, or segments 18a–18e, each of which generates a magnetic field when supplied with a direct current. Current is supplied to segments 18a–18e through brushes 20 and 22 are connected to respective positive and negative sides of a direct current source, and which sequentially contact contacts 24a–24e to sequentially deliver current to each of segments 18a–18e as rotor 13 rotates. As electrical contact is repeatedly made and broken with segments 18a–18e, voltage spikes occur across the brushes which is associated with the occurrence of electromagnetic interference (EMI) in the DC supply circuitry as discussed above.

Turning to FIGS. 3–5, an EMI suppressing interconnect according to the present invention is shown generally at 26 in FIG. 3. In general terms, EMI suppressing interconnect 26 is a novel capacitive device which provides unexpectedly effective suppression of EMI in the DC supply circuitry. EMI suppressing interconnect 26 includes a first insulated conductive lead 28 for being connected to the positive side of a motor drive DC source (not shown), and a second insulated conductive lead 32 for being connected to the negative side of a motor drive DC source. Each of leads 28 and 32 terminates at a tinned connector tab 36 for electrically connecting the lead to a corresponding DC source connector (not shown). Leads 28 and 32 are connected at their respective opposite ends to copper sheets 38 and 40 as best seen in cross-section in FIG. 5. In the preferred embodiment, copper sheets 38 and 40 are sheets of copper 50 mm in length and width, and 0.0014 inches thick. Tinned solder pads 42 and 44 extend outwardly from the edges of copper sheets 38 and 40 as shown for being connected to the respective positive and negative terminals 30 and 34 of the DC motor 10. The terminals 30 and 34 of the motor are referenced as positive and negative for clarity according to conventional practice. In operation, it will be recognized by those skilled in the art that the polarity of the motor is reversed in order to reverse the direction of operation. Accordingly, each terminal is alternatively connected to each side of the DC source.

Copper sheets 38 and 40 are positioned side-by-side and sandwiched between a pair of insulative sheets of MYLAR ®, 46 and 48. In the preferred method of manufacturing the present invention, copper sheets 38 and 40 are formed by etching a single sheet of copper to form a pair of electrically isolated sheets as shown in FIG. 3. When so formed, leads 28 and 32 are formed as shown in FIG. 3 as well. MYLAR ® sheets 46 and 48 are sized to envelop and isolate copper sheets 38 and 40. A layer of contact adhesive 54 is applied to the outer surface of insulative sheet 48 for adhering the assembly to motor housing 12.

An alternative embodiment is shown in FIGS. 3A, and differs from the embodiment shown in FIG. 3 only in the relative positions of leads 28 and 32, and tinned solder pads 42 and 44.

An alternative embodiment of the present invention shown in FIG. 4 differs in that it is includes two aligned copper sheets 49 and 51 which are separated by a MYLAR ® sheet 50. A second MYLAR ® sheet 52 overlays copper sheet 51. A layer of contact adhesive 54 is applied to the exposed surface of copper sheet 49 and serves to adhere the assembly to motor housing 12.

Interconnect 26 is installed on motor 10 by being wrapped around motor housing 12 as shown in FIG. 7, and secured in place by adhesive layer 54. Tinned solder pads 42 and 44 are soldered to positive and negative motor terminals 30 and 34 respectively, and leads 28 and 32 are connected to respective positive and negative terminals of a DC supply source (not shown).

The EMI reduction is believed to result from a capacitive coupling between copper sheets 38 and 40 and motor housing 12. It is further believed that by connecting solder pads 42 and 44 to positive motor terminal 30 and negative motor terminal 34 respectively, a capacitive coupling is also formed between the motor terminals and motor housing 12 which also acts to reduce the levels of EMI generated by the commutating action of the motor in the circuitry of the DC source. The level of EMI reduction afforded by EMI suppressing interconnect 26 is unexpectedly high, as demonstrated by the results of the following example.

EXAMPLE 1

Figure 8:
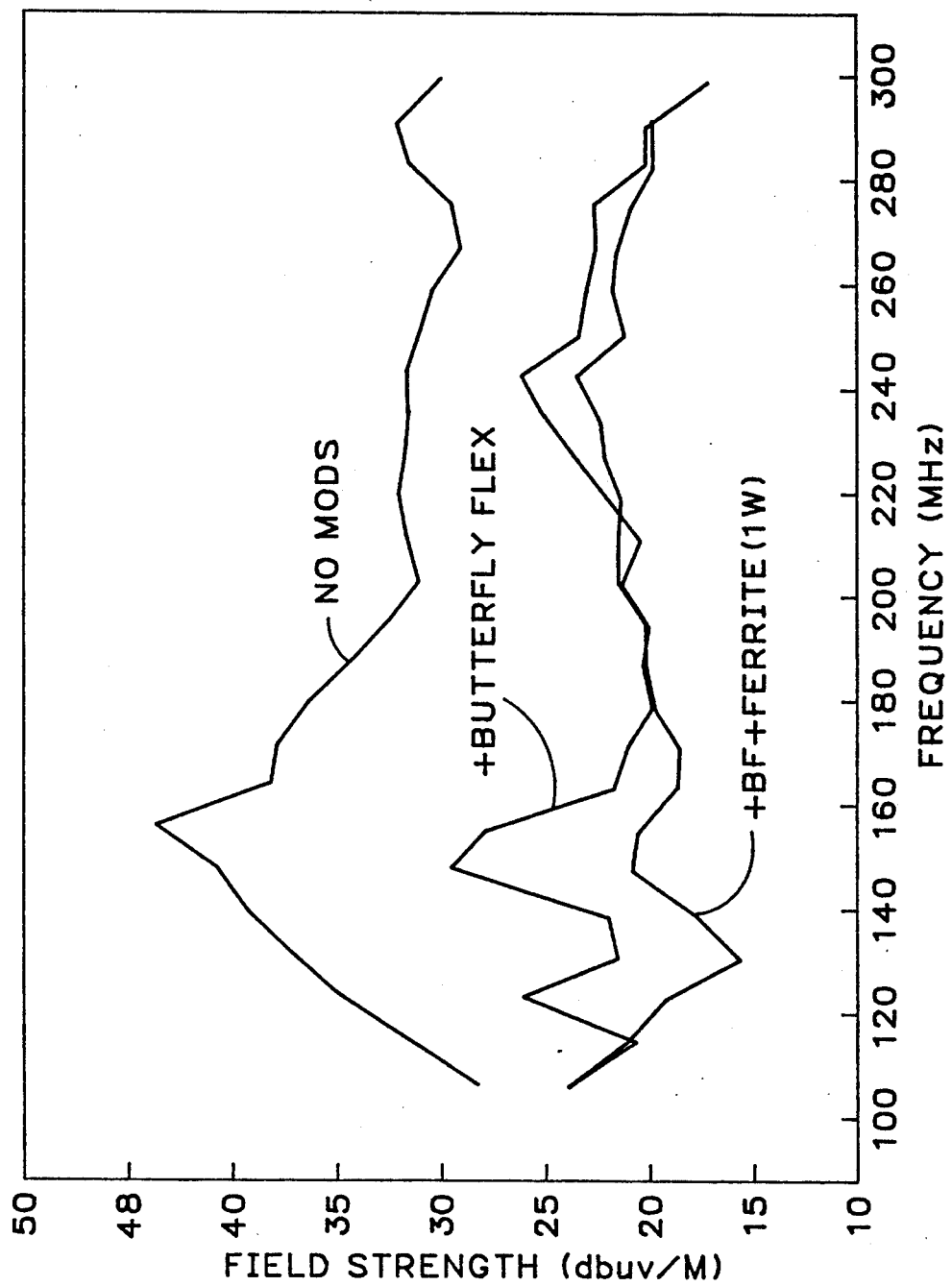
FIG. 8 is a graph showing EMI levels generated by a typical printer head drive DC motor before and after being fitted with an EMI suppressing interconnect and ferrite ring according to the present invention.

A five segment, 19 volt DC printer head drive motor was tested for EMI levels during operation, and was found to have the EMI levels as shown in FIG. 8. An EMI suppressing interconnect 26 according to the preferred embodiment of the present invention was then installed. The EMI suppressing interconnect was of the design shown in FIG. 3, with 0.001 inch thick copper sheets, 50 mm by 50 mm sandwiched between a pair of 0.001 inch thick, 50 mm by 110 mm MYLAR ® sheets. The dimensions of the MYLAR ® must be sufficient to fully encapsulate and isolate the copper sheets, and the specific dimensions may therefore vary. A 0.001 inch thick layer of adhesive was applied to the outer surface of one of the MYLAR ® sheets, and the interconnect secured to the motor housing 12 as discussed above. The motor was again tested for EMI levels during operation. Unexpected and significant reductions were seen as shown in FIG. 8. The levels of EMI reduction achieved by the interconnect of the present invention are unexpected because they are greater than the levels of reduction which would be expected by use of known capacitors of similar capacitance values when installed in conventional configurations on the motor.

The capacitance value of a capacitor can normally be described by the known capacitive expression for two conductors having common overlapping area $A_1$ and separated by a fixed distance ($d_1$) as follow:

$$C = (A_1 \times E_R \times E_0)/d_1$$

where
$E_R$ = the relative permittivity of the insulator; and
$E_0$ = the permittivity of free space.

For example, for the cable of FIG. 4 using a MYLAR ® insulator having a $E_R = 5$, where the dimension of the each of the conductors is 0.055 m × 0.110 m, with a total distance between the conductors, for the first capacitance, and between the second conductor and the casing, for the second capacitance, is equal to $9 \times 10^{-5}$ m, the first and second capacitance is calculated to be:

$$C_{1,2} = ((0.055 \text{ m} \times 0.100 \text{ m}) \times (5 \times 8.85 \text{ pF/m}))/(9 \times 10^{-5} \text{ m})$$

$$C_{1,2} = 3.0 \text{ nF}$$

When discrete capacitors of like capacitance were connected across motor terminals 30 and 34, and between each of terminals 30 and 34 to motor housing 12, the level of EMI attenuation was significantly less than achieved with the present invention.

While DC interconnect 26 provides significant and adequate EMI suppression, additional EMI suppression may be achieved to meet more restrictive limits by use of a ferrite ring in conjunction with a DC interconnect according to the present invention. Referring to FIG. 6, a ferrite ring is shown generally at 56, and includes an aperture 57. In the present example, conductive leads 28 and 32 were threaded through the aperture 57 of a ferrite ring 15 mm in length and width and 7.5 mm thick, and the EMI attenuation again. The results are shown in FIG. 8, and show further attenuation of EMI by use of the combination of a DC interconnect and a ferrite ring.

Having described and illustrated the principles of the invention in a preferred embodiment thereof, it should be apparent that the invention can be modified in arrangement and detail without departing from such principles. I claim all modifications and variation coming within the spirit and scope of the following claims.

We claim:

1. A flexible, unitary EMI suppressing interconnect for connecting a DC motor to a DC source, said interconnect comprising:
   a first conductive sheet having a conductive lead for being connected to a positive terminal of a direct current source, and having a connector for being electrically connected to a first terminal of said motor;
   a pair of insulative sheets permanently affixed to opposed sides of the first conductive sheet;
   a second conductive sheet having a conductive lead for being connected to a negative terminal of a direct current source, and having a connector for being electrically connected to a second terminal of said motor;
   a pair of insulative sheets permanently affixed to opposed sides of the second conductive sheet;
   each of said first and second conductive sheets and said insulative sheets adapted for enveloping a portion of a housing of said DC motor for reducing EMI generated by the commutating action of the motor.

2. An EMI suppressing interconnect according to claim 1 wherein said first and second conductive sheets are disposed between a single pair of insulative sheets and are laterally spaced apart from one another.

3. An EMI suppressing interconnect according to claim 1 wherein said first and second conductive sheets are disposed in substantial alignment on opposite sides of a common insulative layer.

4. An EMI suppressing interconnect according to claim 1 which further comprises an adhesive disposed on an outer surface of one said insulative sheet for adhering a portion of said interconnect to an exterior surface of a DC motor.

5. An EMI suppressing interconnect according to claim 1 wherein said conductive sheets are copper.

6. An EMI suppressing interconnect according to claim 1 wherein said insulative sheets are formed from a polyester.

7. A DC motor comprising:
   a) a housing including means for generating a first magnetic field;
   b) first and second electrically conductive brushes mounted in said housing;
   c) a commutator rotatably mounted within the housing, said commutator having a plurality of conductive segments, each said segment for generating a second magnetic field responsive to a direct current passed therethrough, said first and second magnetic fields for cooperatively driving said commutator;
   d) each said conductive segment having first and second contacts for periodically contacting said first and second brushes for passing said direct current through each said segment as said commutator is rotated; and
   e) a flexible, unitary EMI suppressing interconnect, said EMI suppressing interconnect comprising a first conductive sheet having a conductive lead adapted for being connected to a positive terminal of a direct current source, and having a connector electrically connected to said first brush, said first conductive sheet disposed between a pair of electrically insulative sheets, a second conductive sheet having a conductive lead adapted for being connected to a negative terminal of the direct current source, and having a connector electrically connected to a negative terminal of the motor, said second conductive sheet disposed between a pair of electrically insulative sheets, and each said conductive sheet and its corresponding insulative sheets enveloping a portion of said motor housing.

8. A DC motor according to claim 7 wherein said first and second conductive sheets are disposed between a single pair of insulative sheets and are laterally spaced apart from one another.

9. A DC motor according to claim 7 wherein said first and second conductive sheets are disposed in substantial alignment on opposite sides of a common first insulative layer.

10. A DC motor according to claim 7 wherein said interconnect further comprises an adhesive affixing a portion of said EMI suppressing interconnect to an exterior surface of said motor.

11. A DC motor according to claim 7 wherein said conductive sheets are copper.

12. A DC motor according to claim 7 wherein said insulative sheets are formed from a polyester.

* * * * *